Dec. 17, 1940.  H. FOCKE  2,225,002
CONTROL MEANS FOR ROTATING WING AIRCRAFT
Filed June 30, 1939   3 Sheets-Sheet 1
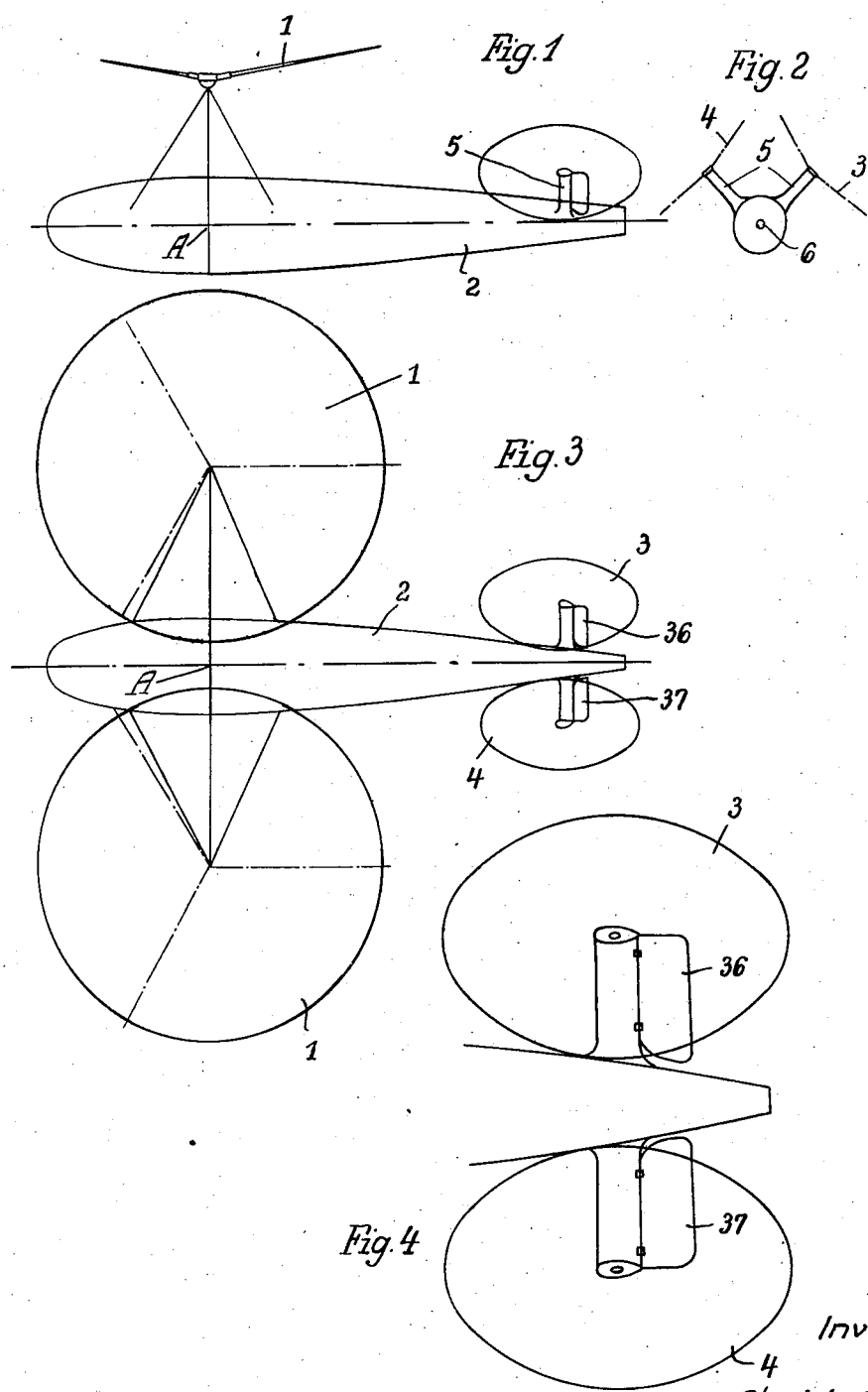
Inventor:
Henrich Focke
By
Watson, Cole, Grindle & Watson Dec. 17, 1940.  H. FOCKE  2,225,002
CONTROL MEANS FOR ROTATING WING AIRCRAFT
Filed June 30, 1939  3 Sheets-Sheet 3

Inventor:
Henrich Focke
By
Watson, Cole, Grindle & Watson
Attys.

Patented Dec. 17, 1940

2,225,002

UNITED STATES PATENT OFFICE 2,225,002

CONTROL MEANS FOR ROTATING WING AIRCRAFT

Henrich Focke, Bremen, Germany

Application June 30, 1939, Serial No. 282,271
In Germany December 3, 1938

2 Claims. (Cl. 244—17)

This invention comprises improvements in or relating to elevational and directional control means for rotating wing aircraft, of the type comprising auxiliary rotors disposed at points spaced from the centre of gravity of the aircraft and being adjustable in pitch.

It is an object of the present invention to provide an arrangement of such auxiliary rotors for obtaining optimum aero-dynamical conditions for the operation of rotors and minimum interference between adjacent auxiliary rotors.

Another object of the invention is to provide a simple driving arrangement for a pair of auxiliary rotors.

Still another object of the invention is to provide a control system which is very simple, light and safe in operation.

With these and further objects in view, as may become apparent from the within disclosures, the invention relates not only to the structures herein pointed out and illustrated but comprises further structures coming within the scope of what hereinafter may be claimed.

The character of the invention, however, may be best understood by reference to certain of its structural forms as illustrated by the accompanying drawings in which:

Fig. 1 is a side elevation of an aircraft having the invention applied thereto,

Fig. 2 is a rear end elevation of Fig. 1,

Fig. 3 is a plan of Fig. 1,

Fig. 4 is the right hand end portion of Fig. 3, only to a much larger scale,

Similar reference numerals denote similar parts in the different views.

Figure 5:
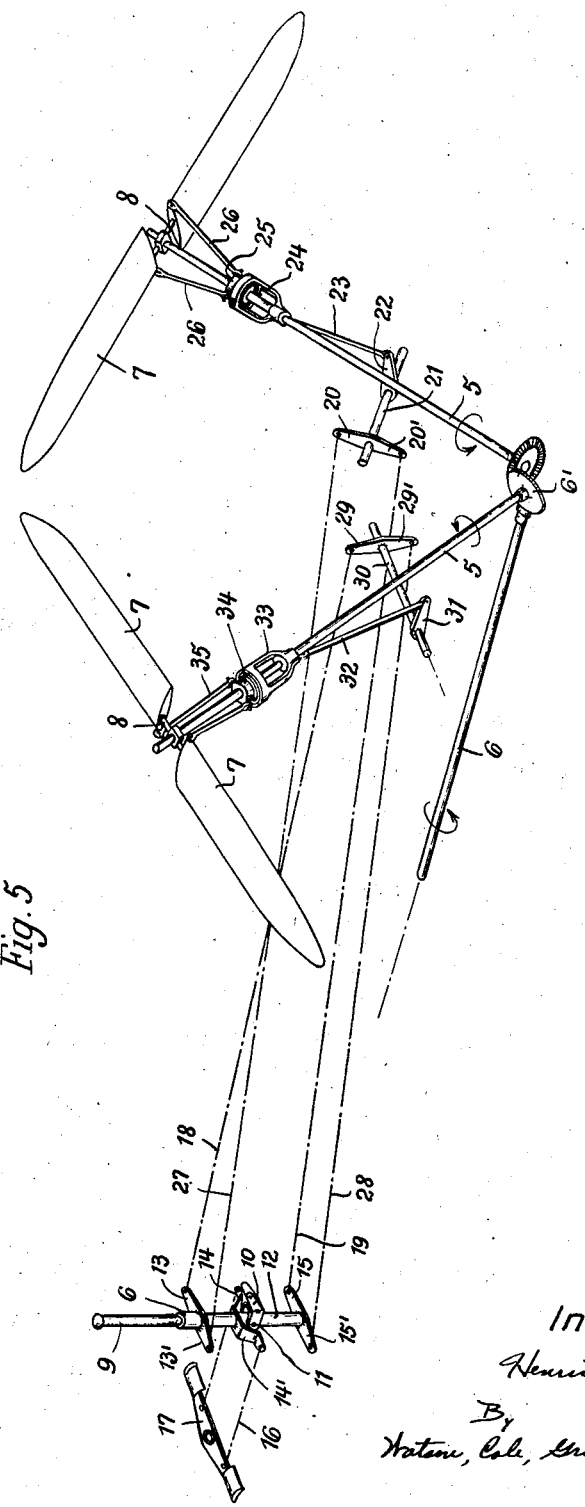
Fig. 5 is a perspective view showing some constructional details of the control and Fig. 6 is a perspective view identical to Fig. 5 but showing various parts which have been omitted in Fig. 5 for the sake of clarity.

Referring now to the drawings in greater detail, it will be noted that a pair of main rotors 1 are arranged in known manner above the aircraft body 2 and side by side. It will be apparent, however, that the improved control means hereinafter described may be advantageously employed if the rotors are arranged one above the other or if a single rotor is used. The control means in the example illustrated consists of a pair of rearwardly disposed auxiliary rotors 3 and 4 and the shafts 5 of these rotors are mounted at the end of the body 2 at an inclination of about 45° from the vertical, so that their axes of rotation form an upright V. As seen from the figures, the auxiliary rotors are arranged symmetrically to the longitudinal axis of the aircraft at a point spaced from the point of intersection of the vertical, longitudinal and transverse axes of the aircraft which point has been indicated at A. The shafts 5 are driven from a central shaft 6 in the body, through a bevel gear system 6', Fig. 5, and support the right hand rotor 3 and the left hand rotor 4 so that these rotors may be said to form an inverted V when seen in the rear elevation of Fig. 2.

As shown in Fig. 5, the pitches of the auxiliary rotors are individually adjustable from a zero position corresponding to the normal position of the associated control organs. To this end, the blades 7 of these rotors are swingably mounted on shafts 8. The control stick 9 of the aircraft is swingable about a forked bracket 10 at 11 in the usual manner and the sleeve 12 thereon with its arms 13, 13', 14, 14', 15, 15', is rotatable about the axis of the stick, by means of cables 16 connected to the arms 14 and operated by a pedal control 17. The arm 13 of the lever 13, 13' is connected, by a cable 18, to an arm 20 of a lever 20, 20' on a shaft 21, arm 20' of which is connected, by a cable 19, to the arm 15 of the lever 15, 15'. A further lever 22 fast on shaft 21 is linked, by a rod 23, to a slidable sleeve 24 carrying a ball bearing 25. The movable race ring of the ball bearing is linked, by rods 26, to the swingable blades 7 of the right hand rotor. Similarly, further cables 27 and 28 connect the arms 13' and 15' to arms 29 and 29' on a shaft 30 the lever 31 of which is linked, by a rod 32, to a slidable sleeve 33 carrying a ball bearing 34 and the movable race ring of this ball bearing is linked, by rods 35, to the swingable blades 7 of the left hand rotor.

The control of the auxiliary rotors will now be described.

For the elevational control (stabilizing or levelling up of the aircraft), the control stick 9 is tilted forwardly or backwardly. For instance, by pushing the control stick, a pull is exerted on the cables 18 and 27 and a positive pitch is imparted to the blades 7 of both auxiliary rotors, through intermediation of the members 29, 30, 31, 32, 33, 34, 35 and 20, 21, 22, 23, 24, 25, 26, in a manner to produce two equally strong obliquely downwardly directed rotor streams which unite in the plane of symmetry of the aircraft and proceed vertically downwardly as a common stream and, due to the reaction thereof, the end of the body of the aircraft is lifted up and the nose of the aircraft is therefore depressed. On the other hand, if the control stick 9 is pulled, then a negative pitch is imparted to the two auxiliary rotors, through the transmission 15', 28, 29', 30, 31, 32, 33, 34 and 35 or 15, 19, 20', 21, 22, 23, 24, 25 and 26, whereby they produce upwardly directed air currents, in this fashion depressing the end of the body and elevating the front part thereof.

For the directional control, for example for making a left hand turn, the pitch of the right hand rotor 3 is adjusted from the pilot's seat to be positive and that of the left hand rotor 4 is adjusted to be negative. To this end, the pedal 17 is swung in a left hand turning direction, whereby the sleeve 12 on the control stick is swung in the same direction, by the cable connection 16 and the cable 18 on arm 13 and the cable 19 on arm 15 cause the desired differential pitch of the two rotors, by their associated parts 29, 30, 31, 32, 33, 34 and 35 or 20', 21, 22, 23, 24, 25 and 26, respectively. Consequently, the rotor 3 projects an air stream obliquely downwardly and to the left and the rotor 4 an air stream obliquely upwardly and to the left. Since the one stream is directed upwardly and the other downwardly, an elevational control effect does not occur, but, since both streams are directed towards the left, a directional control effect occurs which tends to turn the end of the body towards the right and the front part of the body, on the other hand, towards the left, as was intended. Naturally, the same thing applies appropriately to the right hand turn. Any constantly present moment about the vertical axes can naturally be neutralized by a constantly existing directional control setting, which may be effected in any suitable manner known.

Combined elevational and directional control effects may naturally be simply achieved, if the positive or negative alteration of pitch is executed to unequal extents in the two rotors, by combined tilting of the control stick and swinging of the pedal 17.

In order that in the event of a disturbance in the drive of the rotating control surfaces, a control effect shall still be insured at least in forward flight, in accordance with the invention there are provided, on the rotor shafts 5 (Fig. 6) or on the rotor shaft supports (Fig. 4), auxiliary control surfaces 36 and 37 (Fig. 6) which, actuated in opposite direction, act as directional control means and, actuated in the same direction, act as elevational control means. The auxiliary control means have been shown separately in Fig. 6 with their associated organs, but it will be clear that the said surfaces and organs really form part of the control system shown in Fig. 5 from which they have been omitted merely for the sake of clearness.

Figure 6:
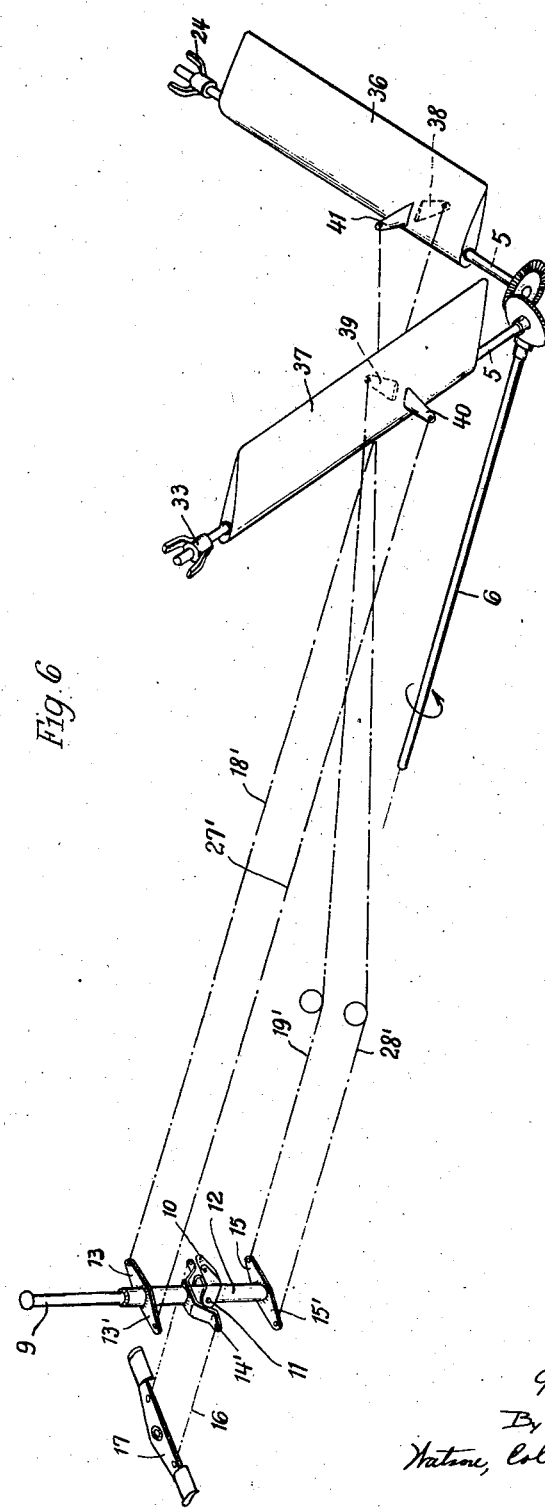

Referring to Fig. 6, it will be seen that the auxiliary control surfaces, due to their pivotal arrangement on the shafts 5 of the auxiliary rotors, are obliquely positioned to produce obliquely directed forces having vertical and transverse components. Cables 18', 19', 27', 28' which may be at least partly identical with the cables 18, 19, 27 and 28, respectively, connect the arms 13, 13', 15 and 15' on the sleeve 12 of the control stick with arms 38, 39, 40 and 41, respectively, on the auxiliary control surfaces, thereby transmitting the movements of the pedal 17 and control stick 9 upon the auxiliary control surfaces also. Idle rollers 42, 43 may be provided to guide the cables. As will be understood from the foregoing in connection with Fig. 6, the elevational and directional effects produced by the auxiliary control surfaces are similar to those of the auxiliary rotors, with the difference, of course, that the intensity of said effects depends on the forward speed of the aircraft while the intensity of the control effects caused by the auxiliary rotors is not, or at least not substantially, dependent on said forward speed.

It will thus be seen from the foregoing that the control arrangement and, more particularly, the drive of the two auxiliary rotors, becomes very simple due to the V-shaped arrangement of the axes thereof and the same rotors can be used to effect both, elevational and directional control. Moreover, the two rotor streams do not interfere with each other at all when they are directed upwardly (control movement for pulling nose up). When they are directed downwardly (control movement for pushing nose down), they certainly unite convergingly below the rotors, but their impulse is not impaired and is effective to the full extent.

I claim:

1. In a rotating wing aircraft, a pair of auxiliary rotors arranged symmetrically to the longitudinal axis of the aircraft and at a point spaced from the point of intersection of the vertical, longitudinal and transverse axes of the aircraft, the axes of rotation of said auxiliary rotors forming together an upright V, means for driving said rotors, means for adjusting the pitch of said auxiliary rotors, non-rotating control surfaces associated with said rotors and swingable about pivots which are parallel to the axes of rotation of said rotors and means for adjusting the incidence angle of said control surfaces.

2. In a rotating wing aircraft, a pair of auxiliary rotors arranged symmetrically to the longitudinal axis of the aircraft and at a point spaced from the point of intersection of the vertical, longitudinal and transverse axes of the aircraft, the axes of rotation of said auxiliary rotors forming together an upright V, means for driving said rotors, means for adjusting the pitch of said auxiliary rotors, non-rotating control surfaces associated with said rotors, means for adjusting said control surfaces to similar incidence angles for the purpose of an elevational control and means for adjusting a differential incidence angle of said control surfaces for the purpose of a directional control of the aircraft.

HENRICH FOCKE.